(12) United States Patent
Chang

(10) Patent No.: US 7,527,246 B2
(45) Date of Patent: May 5, 2009

(54) FAN

(76) Inventor: Mao-Kun Chang, 235 Chung-Ho Box 8-24, Taipei (TW)

( * ) Notice: Subject to any disclaimer, the term of this patent is extended or adjusted under 35 U.S.C. 154(b) by 338 days.

(21) Appl. No.: 11/604,143

(22) Filed: Nov. 27, 2006

(65) Prior Publication Data

US 2008/0122127 A1 May 29, 2008

(51) Int. Cl.
*B01F 3/04* (2006.01)
(52) U.S. Cl. ............... 261/28; 261/58; 261/84; 261/116
(58) Field of Classification Search .......... 261/28, 261/30, 42, 58, 84, 89, 90, 116, DIG. 3, DIG. 43; 62/259.4; 417/199.1
See application file for complete search history.

(56) References Cited

U.S. PATENT DOCUMENTS

| | | | | |
|---|---|---|---|---|
| 1,951,962 A | * | 3/1934 | Baum | 261/29 |
| 2,137,905 A | * | 11/1938 | Church et al. | 261/28 |
| 4,657,712 A | * | 4/1987 | Milbocker | 261/90 |
| 6,237,896 B1 | * | 5/2001 | Hicks et al. | 261/28 |
| 6,789,787 B2 | * | 9/2004 | Stutts | 261/28 |
| 2006/0245952 A1 | * | 11/2006 | Chen | 417/415 |
| 2008/0256969 A1 | * | 10/2008 | Hall, III | 62/259.4 |

* cited by examiner

*Primary Examiner*—Scott Bushey

(57) ABSTRACT

A fan includes a motor; a front end of a rotary shaft of the motor having an eccentric wheel; a periphery of the blade being installed with a protection web frame; a moisture generator installed at one side of the motor; an interior of the moisture generator having a plug; one end of the plug resisting against a lateral surface of the eccentric wheel; the eccentric wheel serving to drive the plug moving reciprocally in a plug chamber so as to suck water into a moisture generator; then the water is pressured to be sprayed out. Operation of the fan will drive the moisture generator to actuate so as to generate moisture for reducing temperature.

5 Claims, 9 Drawing Sheets

FAN

FIELD OF THE INVENTION

The present invention relates to fans, and particularly to a fan, wherein the operation of the fan will drive the moisture generator to operate so as to suck water into the moisture generator for pressurization. Then the water is sprayed out from the moisture spraying nozzle so that the moisture is blown out with the blade set of the fan and to be dispersed in air. Thus the environmental temperature is decreased effectively

BACKGROUND OF THE INVENTION

Currently, the ways for cooling environmental temperature includes the ways of installing air-conditioners or fans. However, the way for installing air-conditions is expensive and power waste is high. The refrigerant used and dissipated wasted gas will destroy the environment. The cost for installing fan is low an d the fee in using fan is also low. However, the cooling effect by fans is low by the fan blade driving by a motor. The fan only induces convection of air, while it can not reduce the environment temperature.

SUMMARY OF THE INVENTION

Accordingly, the primary object of the present invention is to provide a fan, wherein the operation of the fan will drive the moisture generator to operate so as to suck water into the moisture generator for pressurization. Then the water is sprayed out from the moisture spraying nozzle so that the moisture is blown out with the blade set of the fan and to be dispersed in air. Thus the environmental temperature is reduced effectively.

To achieve above objects, the present invention provides a fan which comprises a fan having a motor; a front end of a rotary shaft of the motor having an eccentric wheel; a periphery of the blade being installed with a protection web frame; a moisture generator installed at one side of the motor; an interior of the moisture generator having a plug; one end of the plug resisting against a lateral surface of the eccentric wheel; the eccentric wheel serving to drive the plug moving reciprocally in a plug chamber so as to suck water into a moisture generator; then the water is pressured to be sprayed out. Operation of the fan will drive the moisture generator to actuate so as to generate moisture for reducing temperature.

The various objects and advantages of the present invention will be more readily understood from the following detailed description when read in conjunction with the appended drawing.

BRIEF DESCRIPTION OF THE DRAWINGS

FIG. 1 is an exploded perspective view of the present invention.

FIG. 2 is a lateral view of the present invention.

FIG. 3 is a lateral view of the moisture generator of the present invention.

FIG. 4 is a cross sectional view along I-I of FIG. 3.

FIG. 5 is a cross sectional view of the moisture generator of the present invention, wherein the operation of the eccentric wheel driven by a motor is illustrated.

FIG. 6 is a cross sectional view of the moisture generator of the present invention, wherein it is illustrated that the plug is driven by the spring to move outwards.

FIG. 7 is a schematic view showing the operation of the water flowing through a loop tube to return to the water inlet chamber as the pressure of the water inlet chamber is greater than that of a ball valve.

FIG. 8 is a schematic view showing the operation of the present invention.

FIG. 9 is a schematic view showing the operation of the moisture is dispersed to air as water is sprayed through the moisture generator.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 9, the structure of the present invention will be described.

See FIGS. 1 and 2, the fan of the present invention has the following elements.

A fan 10 has a motor 11. A rotary shaft 12 of the motor 11 has a blade set 13 at a front end thereof. The rotary shaft 12 is installed with an eccentric wheel 14. A periphery of the blade set 13 is installed with a protection web frame 15.

A moisture generator 20 (FIGS. 2, 3, and 4) is installed at one lateral side of the rotary shaft 12 of the motor 11. An interior of the moisture generator 20 has a water inlet chamber 21, a water outlet chamber 22 and a plug chamber 23. The water inlet chamber 21 and water outlet chamber 22 is formed as an axial channel. The water inlet chamber 21 is installed with a valve sheet 211 and the water outlet chamber 22 is installed with a valve sheet 221. The valve sheet 211 resists against a spring 212. The valve sheet 221 resists against with a spring 222. When the valve sheets 211, 221 are not actuated, they tightly resist against the springs 212, 222 so as to adhere upon the openings of the water inlet chamber 21 and water outlet chamber 22 to be formed as check valves. The water inlet end of the water inlet chamber 21 is screwed with a joint 213 for being connected to a water inlet tube 214. The water outlet end of the water outlet chamber 22 is screwed with a joint 223 for being connected to a water outlet tube 224. Another end of the water outlet tube 224 is connected to a moisture spraying nozzle 24. The moisture spraying nozzle 24 is installed to the protection web frame 15 in front of the fan 10. The plug chamber 23 is installed between the water inlet chamber 21 and the water outlet chamber 22 and is vertical to the water inlet chamber 21 and water outlet chamber 22. Interior of the plug chamber 23 is installed with a plug 231. An inner surface of the plug 231 resists against a spring 232. Another end of the spring 232 has an adjust stud 233. An outer surface of the plug 231 protrudes out of the plug chamber 23 to resist against a lateral surface of the eccentric wheel 14. The eccentric wheel 14 driven by the rotary shaft 12 of the motor 11 will drive the plug 231 to move reciprocally in the plug chamber 23 (FIGS. 5 and 6) so as to suck water into water inlet chamber 21 and then the water is pressured and then is drained out from the water outlet chamber 22. The drained water is transferred to the moisture spraying nozzle 24 through the water outlet tube 224 to be sprayed out. Further, a loop tube 25 is installed between the water inlet chamber 21 and the water outlet chamber 22 (FIG. 4). A ball valve 251 is installed in the loop tube 25. One end of the ball valve 251 resists against a spring 252 so as to form as a check valve.

Figure 1:
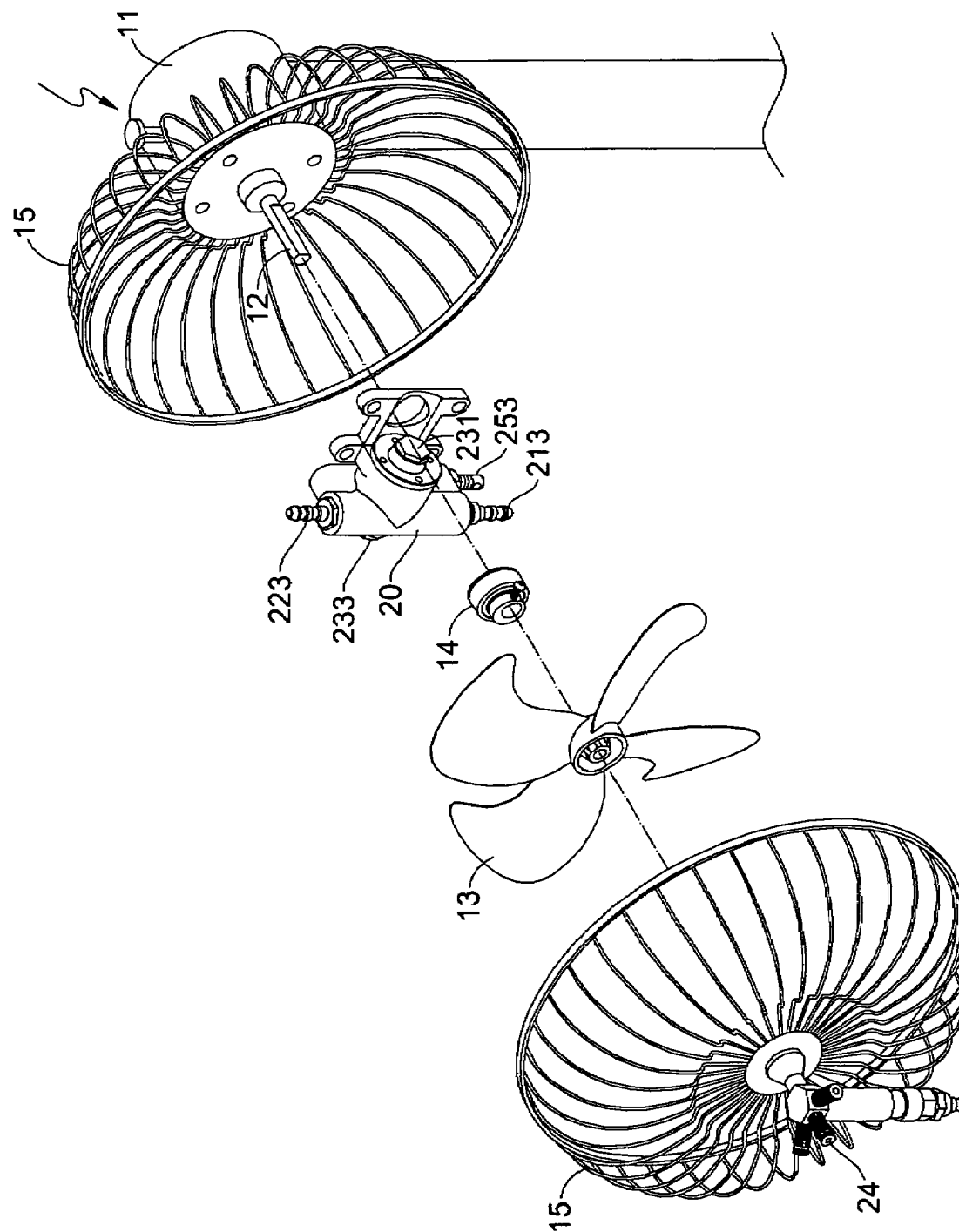
Figure 2:
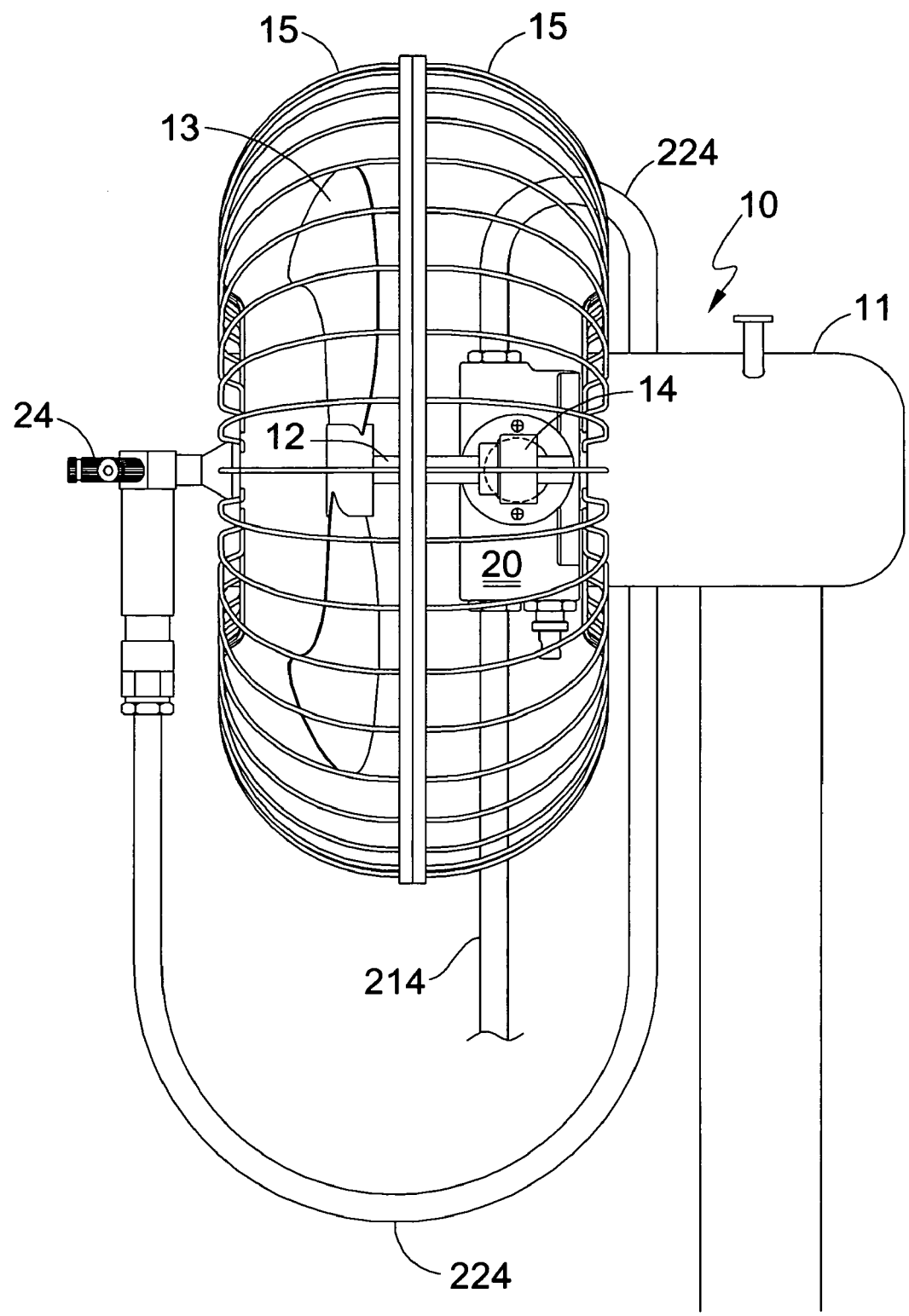
Figure 3:
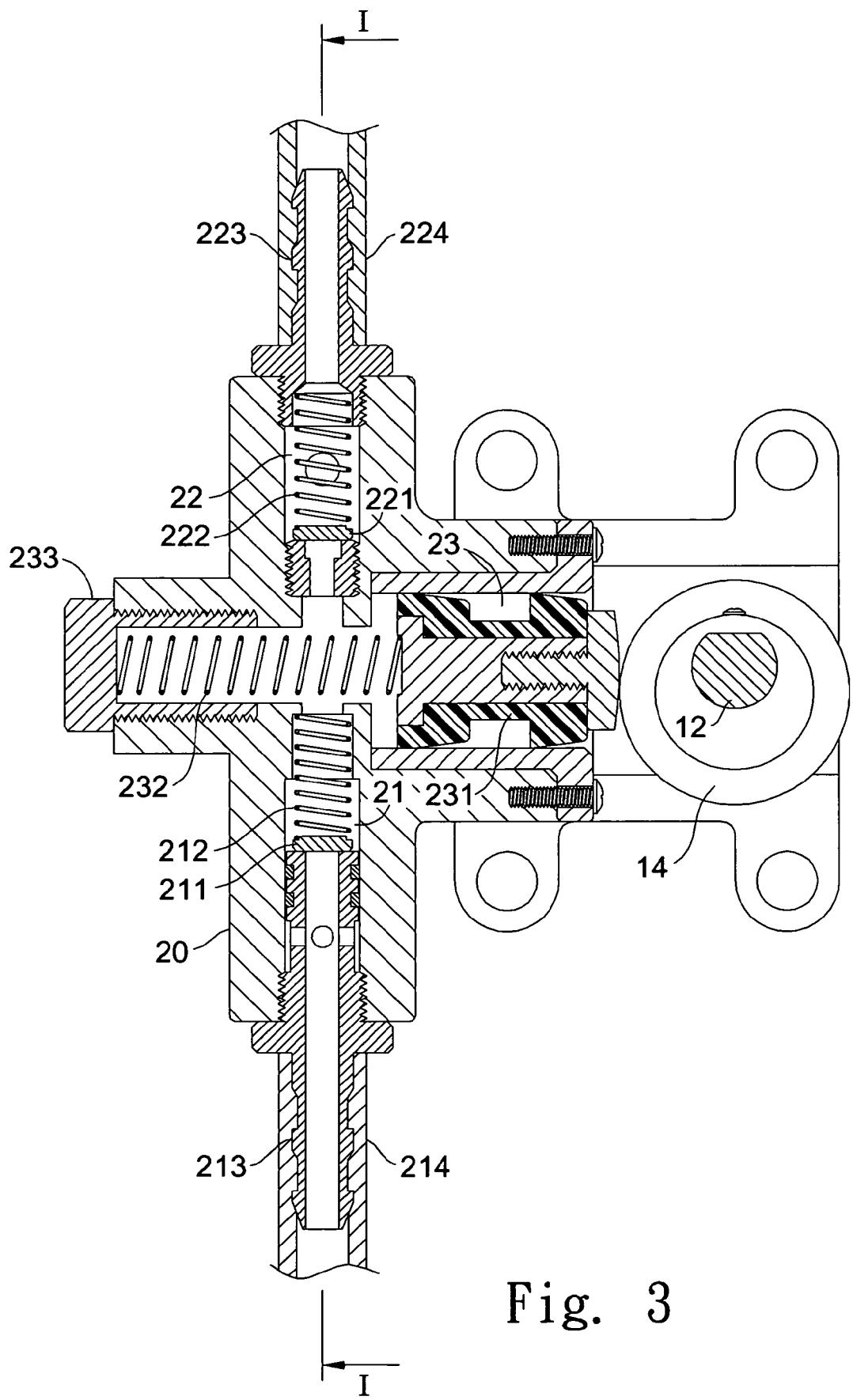
Figure 4:
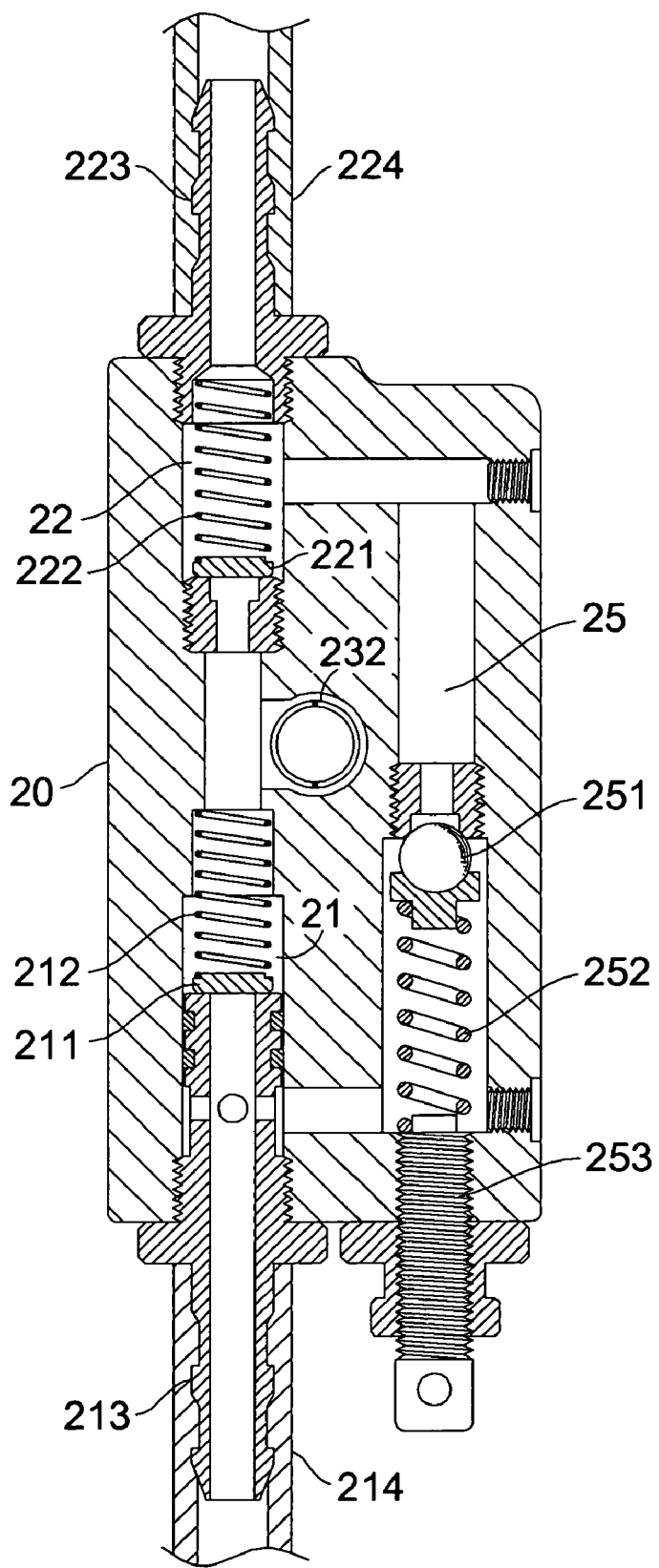
Figure 5:
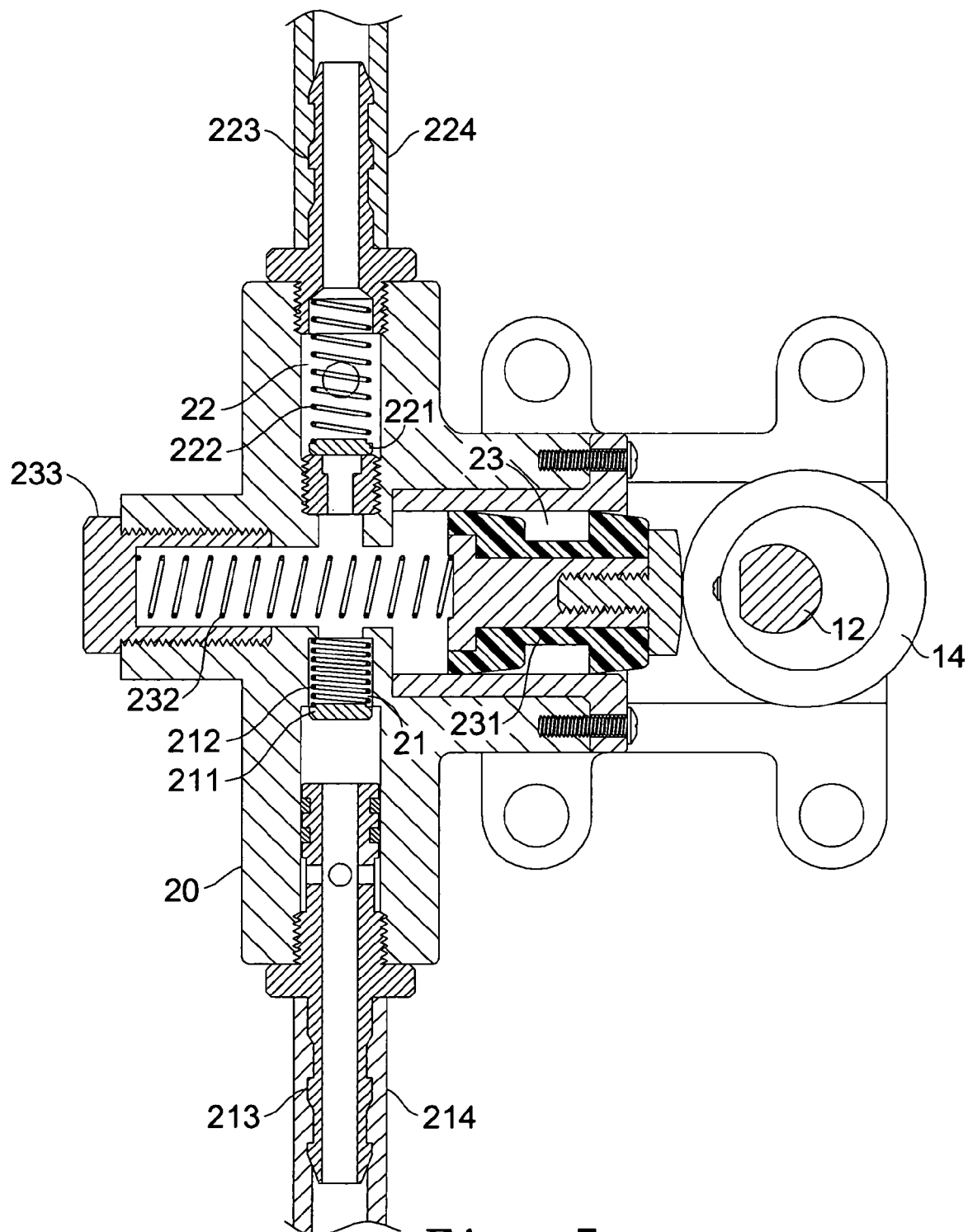
Figure 6:
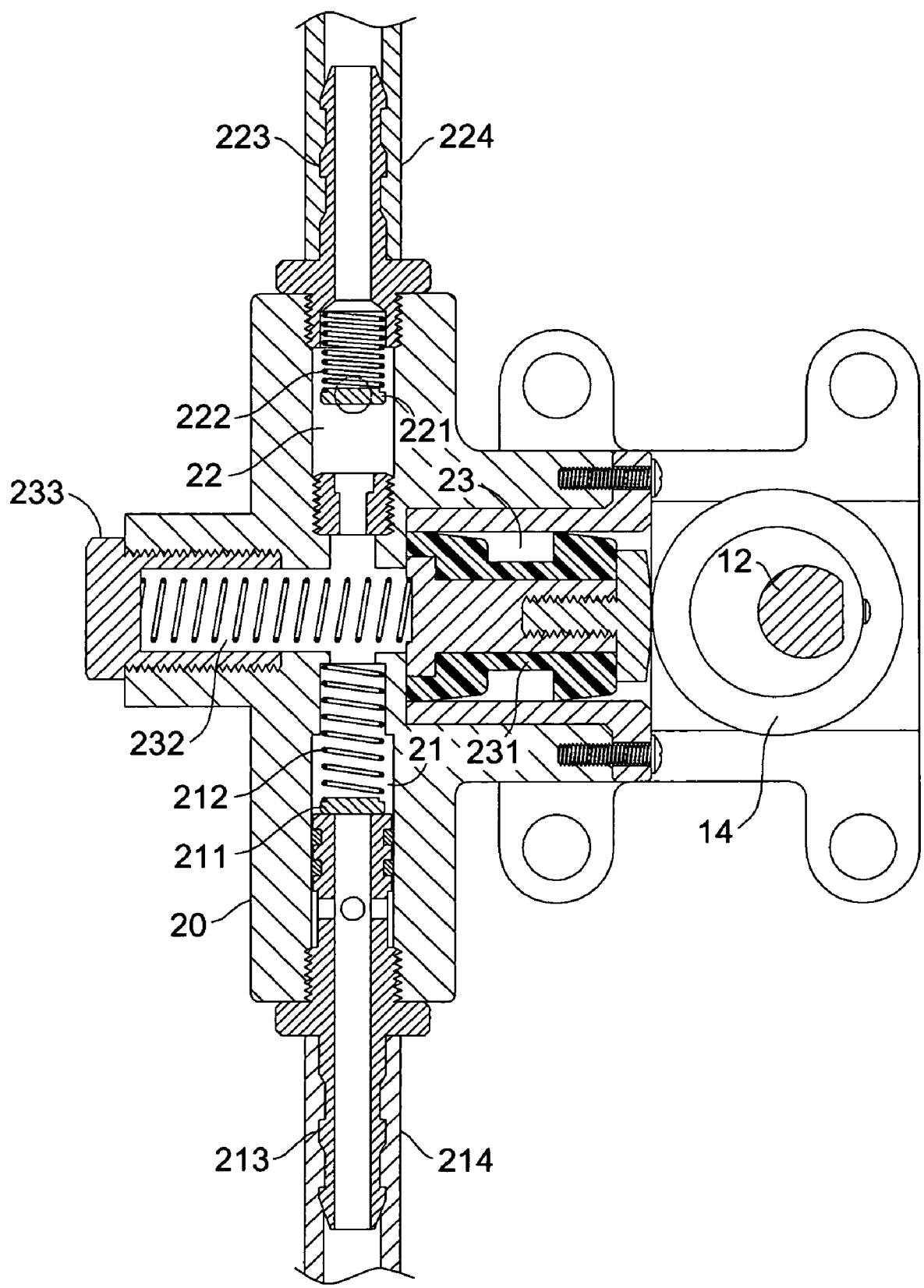
Figure 7:
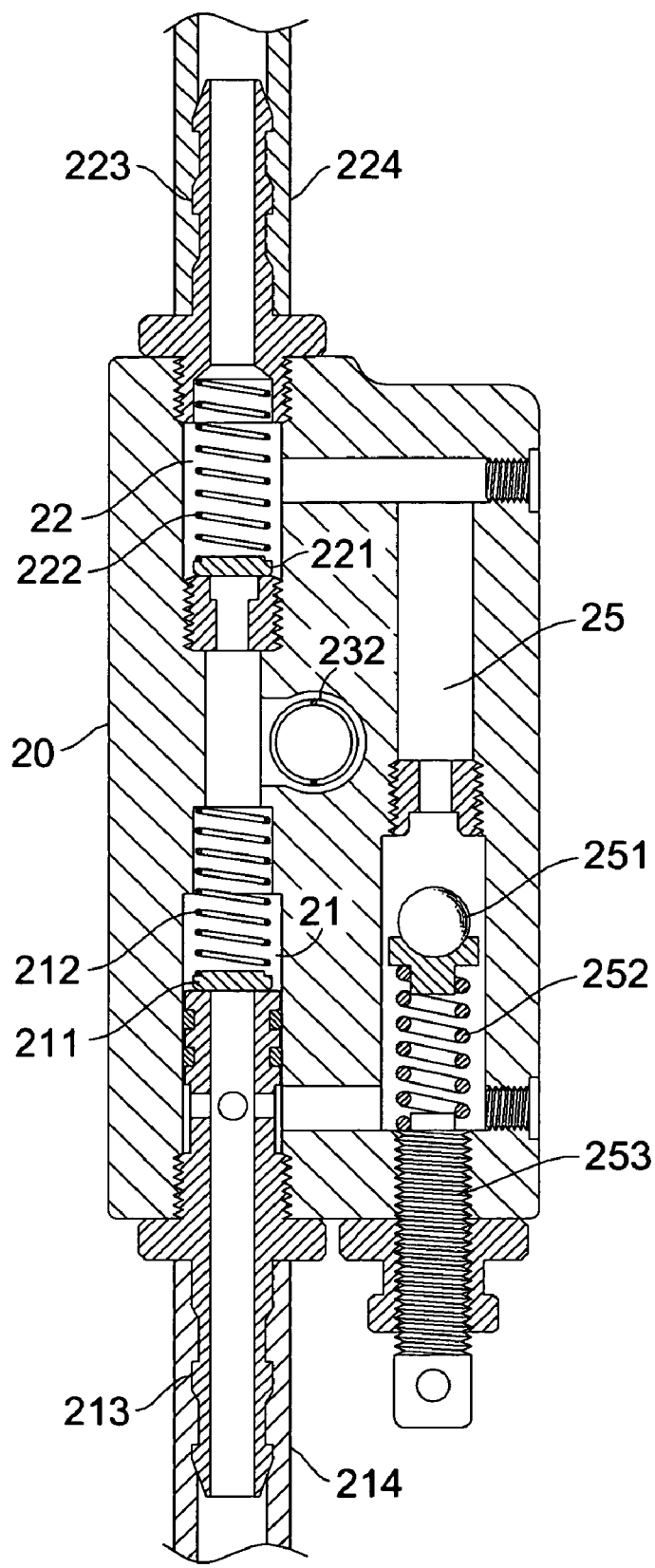

One end of the spring 252 is located with an adjust stud 253. When a pressure of the water outlet chamber 22 is greater than that of the ball valve 251 resisted by the spring 252, the ball valve 251 will open (FIG. 7) so that water in the water outlet chamber 22 returns to the water inlet chamber 21 through the loop tube 25. Thus the adjust stud 253 adjusts the ball valve 251 resisted by the spring 252, the water pressure in the water outlet chamber 22 is adjusted so as to adjust the amount of the moisture from the moisture spraying nozzle 24.

Figure 8:
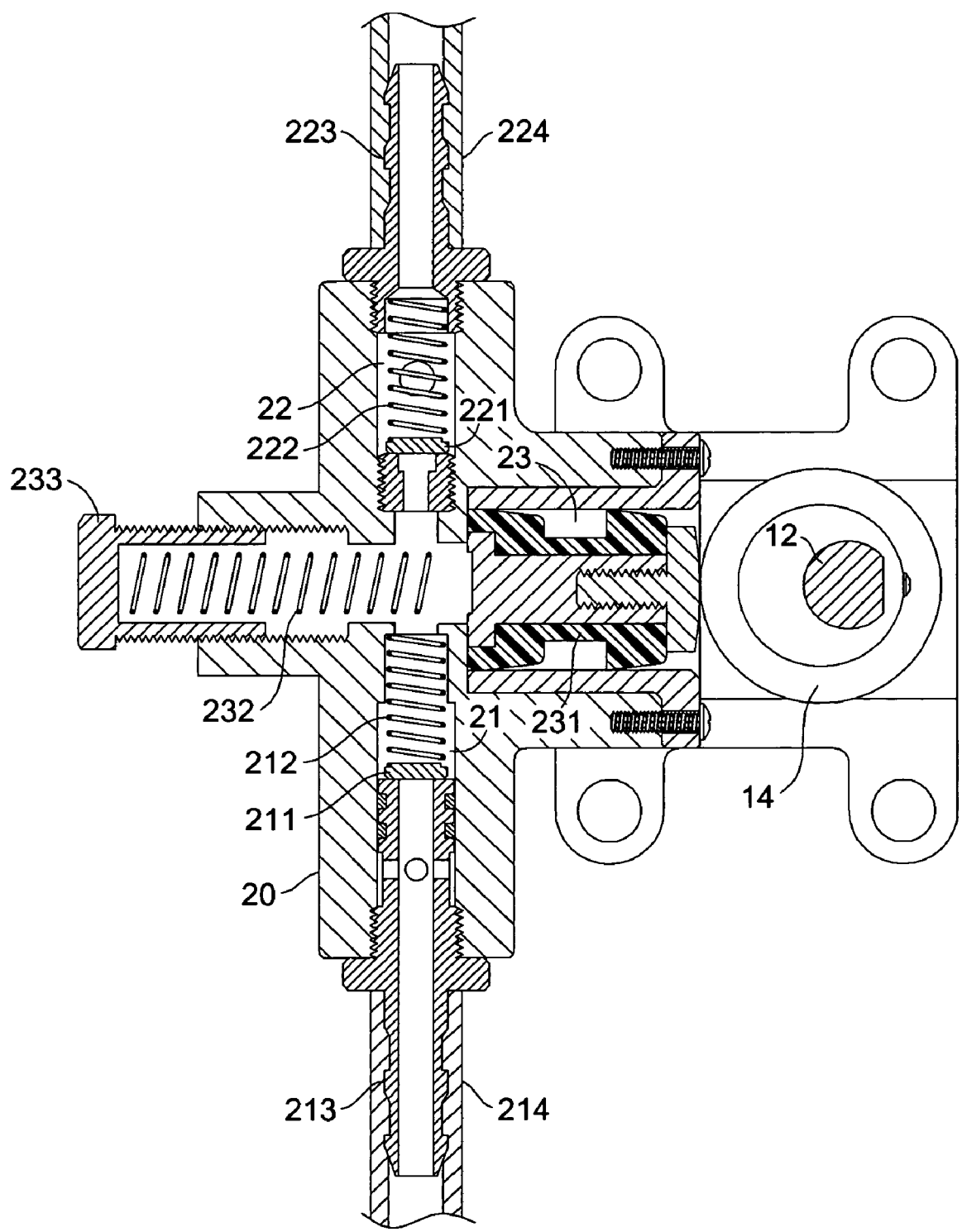
Figure 9:
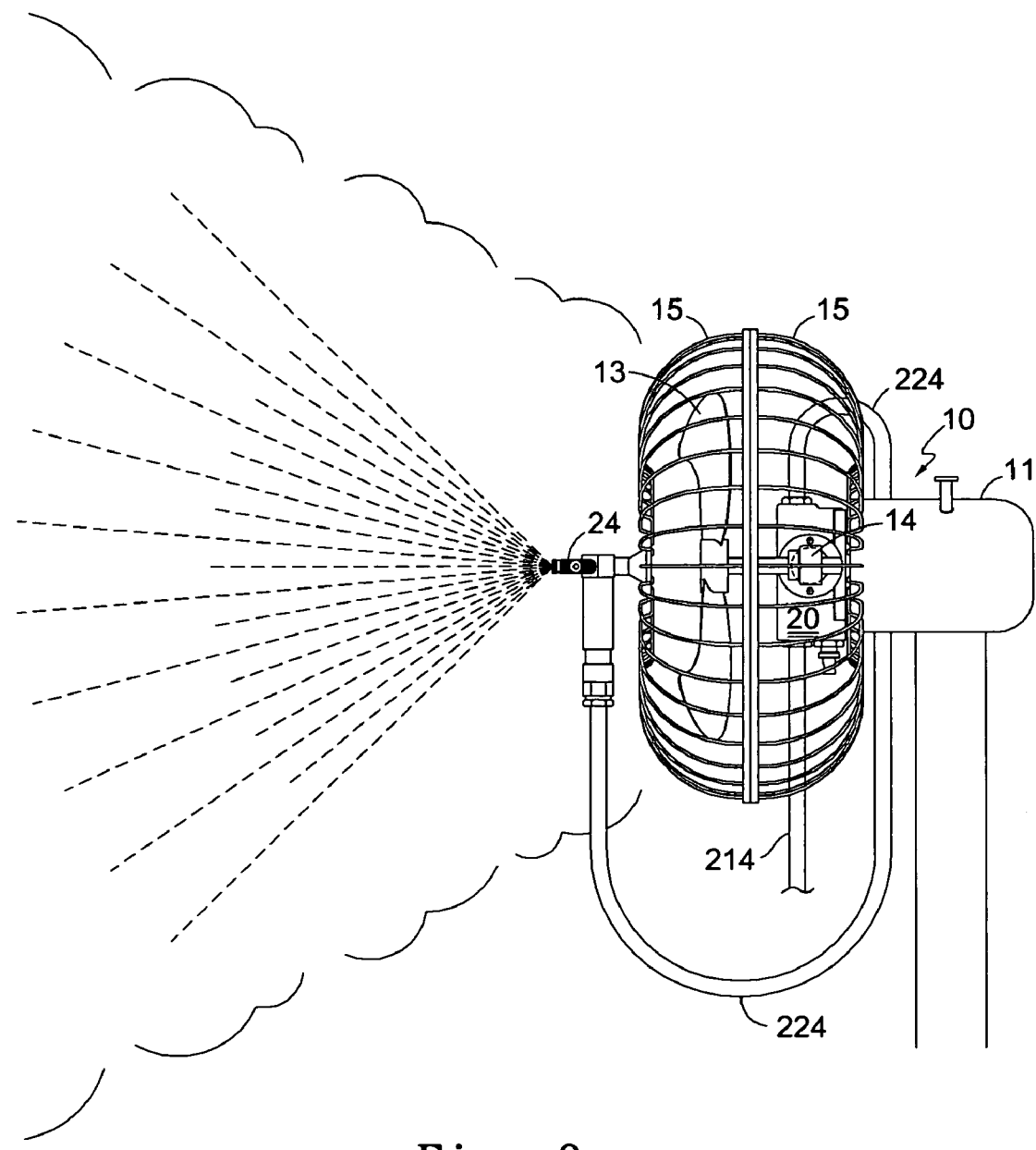

Thus, by above mentioned structure, the operation of the fan will drive the plug 231 of the moisture generator 20 to operate so as to suck water into the moisture generator 20 for pressurization. Then the water is sprayed out from the moisture spraying nozzle 24 so that the moisture is blown out with the blade set 13 of the fan 10 and to be dispersed in air (FIG. 9). Thus the environmental temperature is reduced effectively. Furthermore when it is desired to stop the moisture generator 20, the adjust stud 233 is screwed outwards to release the pressure from the spring 232 to the plug 231 (FIG. 8). Thus the plug 231 is not driven by the eccentric wheel 14. Thereby the moisture generator 20 is stopped and the operation of the fan is not affected.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A fan comprising:
    a motor; a front end of a rotary shaft of the motor having an eccentric wheel; a periphery of the blade being installed with a protection web frame;
    a moisture generator installed at one side of the motor; an interior of the moisture generator having a plug; one end of the plug resisting against a lateral surface of the eccentric wheel; the eccentric wheel serving to drive the plug moving reciprocally in a plug chamber so as to suck water into a moisture generator; then the water is pressured to be sprayed out; and
    wherein operation of the fan will drive the moisture generator to actuate so as to generate moisture for reducing temperature.

2. The fan as claimed in claim 1, wherein a moisture spraying nozzle is installed at the protection web frame in front of the fan.

3. The fan as claimed in claim 1, wherein an inner surface of the plug resists against a spring; another end of the spring has an adjust stud for controlling the actuation of the moisture generator.

4. The fan as claimed in claim 1, wherein the water inlet chamber and water outlet chamber is formed as an axial channel; the water inlet chamber is installed with a valve sheet and the water outlet chamber is installed with a valve sheet; each valve sheet resists against a spring; when the valve sheets are not actuated, they tightly resist against the springs so as to adhere upon the openings of the water inlet chamber and water outlet chamber to be formed as check valves.

5. The fan as claimed in claim 3, wherein a loop tube is installed between the water inlet chamber and the water outlet chamber; a ball valve is installed in the loop tube; one end of the ball valve resists against a spring so as to form as a check valve; one end of the spring is located with an adjust stud for adjusting amount of moisture sprayed from the moisture spraying nozzle.

* * * * *